(12) United States Patent
Aroyan et al.

(10) Patent No.: US 7,952,567 B2
(45) Date of Patent: May 31, 2011

(54) TOUCH SENSOR WITH IMPROVED ELECTRODE PATTERN

(75) Inventors: James L. Aroyan, Soquel, CA (US); Daniel H. Scharff, San Leandro, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 973 days.

(21) Appl. No.: 11/267,759

(22) Filed: Nov. 3, 2005

(65) Prior Publication Data

US 2006/0119587 A1    Jun. 8, 2006

Related U.S. Application Data

(63) Continuation of application No. 10/413,825, filed on Apr. 15, 2003, now abandoned.

(60) Provisional application No. 60/373,022, filed on Apr. 16, 2002.

(51) Int. Cl.
*G06F 3/045* (2006.01)
*G06F 3/041* (2006.01)

(52) U.S. Cl. ............... 345/174; 345/173; 178/18.05

(58) Field of Classification Search ........... 345/173, 345/174; 178/18.01, 18.05–18.07; 338/15; 200/512; 340/407.1
See application file for complete search history.

(56) References Cited

U.S. PATENT DOCUMENTS

| | | | |
|---|---|---|---|
| 4,220,815 A | 9/1980 | Gibson et al. | |
| 4,371,746 A | 2/1983 | Pepper, Jr. | |
| 4,622,437 A * | 11/1986 | Bloom et al. | 178/18.05 |
| 4,661,655 A | 4/1987 | Gibson et al. | |
| 4,731,508 A * | 3/1988 | Gibson et al. | 178/18.05 |
| 4,822,957 A | 4/1989 | Talmage, Jr. et al. | |
| 5,045,644 A * | 9/1991 | Dunthorn | 178/18.05 |
| 5,220,136 A | 6/1993 | Kent | |
| 6,163,313 A * | 12/2000 | Aroyan et al. | 345/173 |
| 6,549,193 B1 | 4/2003 | Huang et al. | |
| 6,593,916 B1 | 7/2003 | Aroyan | |

* cited by examiner

*Primary Examiner* — Srilakshmi K Kumar

(57) ABSTRACT

A touch sensor includes a substrate with a touch region, and a series resistor chain for creating electrical fields across the touch region. The resistor chain comprises a plurality of conductive electrodes that to form overlap resistors therebetween. The electrodes have inner portions that are separated by junctions. The touch sensor also includes insulating regions between the touch region and the resistor chain. The insulating regions are separated by gaps to provide a plurality of conductive pathways to the touch region, thereby minimizing non-linear ripple along the sourcing sides of the substrate. Some of the gaps are junction gaps that are formed between the touch region and junctions. Electrically conductive islands are placed within the junction gaps to provide an electrical node within each junction gap, thereby preventing bunching of equipotential lines within the junction, and minimizing non-linear ripple along the non-sourcing sides of the substrate.

37 Claims, 7 Drawing Sheets

EMPTY GAP

WITH CONDUCTIVE ISLAND

WITH OVERLAP-RESISTOR ELECTRODE EXTENSION

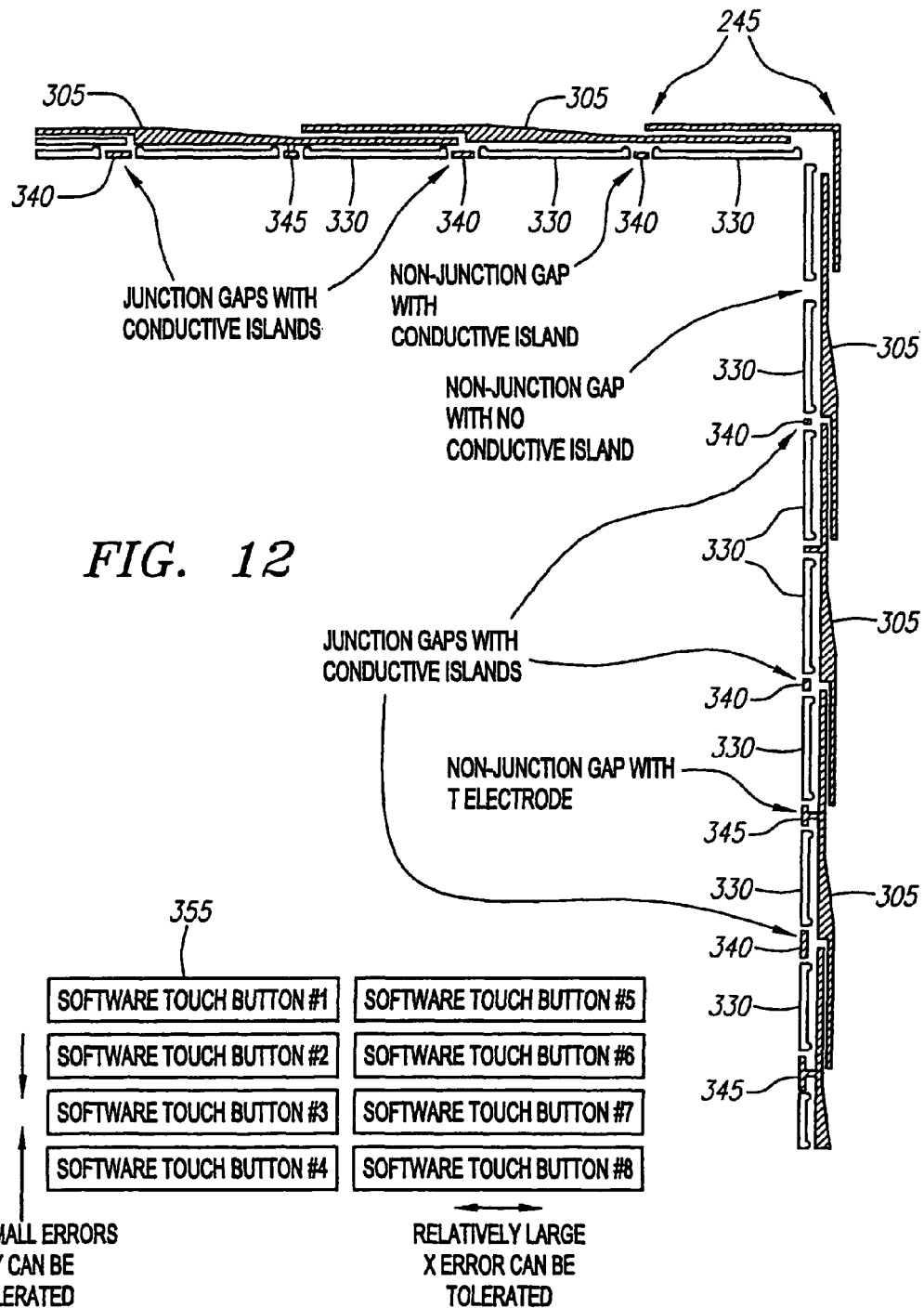

TOUCH SENSOR WITH IMPROVED ELECTRODE PATTERN

RELATED APPLICATIONS

This application is a continuation of U.S. application Ser. No. 10/413,825, filed Apr. 15, 2003, now abandoned, which claimed the benefit of the filing date of U.S. Provisional Application No. 60/373,022, filed Apr. 16, 2002, and entitled "Touchscreen Having A Series Resistor Chain On The Periphery Of A Touch Area," each of which is expressly incorporated herein by reference.

FIELD OF THE INVENTION

The field of the present invention relates to touch sensor technology, and more particularly to resistive and capacitive touch sensor technology.

BACKGROUND OF THE INVENTION

Touch sensors are transparent or opaque input devices for computers and other electronic systems. As the name suggests, touch sensors are activated by touch, either from a user's finger, or a stylus or some other device. Transparent touch sensors, and specifically touchscreens, are generally placed over display devices, such as cathode ray tube (CRT) monitors and liquid crystal displays, to create touch display systems. These systems are increasingly used in commercial applications such as restaurant order entry systems, industrial process control applications, interactive museum exhibits, public information kiosks, pagers, cellular phones, personal digital assistants, and video games.

The dominant touch technologies presently in use are resistive, capacitive, infrared, and acoustic technologies. Touchscreens incorporating these technologies have delivered high standards of performance at competitive prices. All are transparent devices that respond to a touch by transmitting the touch position coordinates to a host computer. An important aspect of touchscreen performance is a close correspondence between true and measured touch positions at all locations within a touch sensitive area located on the touch sensor (i.e., the touch region).

One type of resistive touchscreen, and specifically a 5-wire resistive touchscreen, e.g., the AccuTouch™ product line of Elo TouchSystems, Inc. of Fremont, Calif., has been widely accepted for many touchscreen applications. In these touchscreens, mechanical pressure from a finger or stylus causes a plastic membrane coversheet to flex and make physical contact with an underlying glass substrate. The glass substrate is coated with a resistive layer upon which voltage gradients are excited via electrode patterns that are disposed along the periphery of the substrate. Via electrical connections to the four corners of the coated glass substrate, associated electronics can sequentially excite gradients in both the X and Y directions, as described in U.S. Pat. No. 3,591,718. The underside of the coversheet has a conductive coating that provides electrical continuity between the touch location and voltage sensing electronics. Further details regarding 5-wire resistive touchscreens are found in U.S. Pat. Nos. 4,220,815, 4,661,655, 4,731,508, 4,822,957, 5,045,644, and 5,220,136.

In a typical 5-wire resistive touchscreen, an electrode pattern along each border of the substrate is operated in both a "sourcing" mode and a "non-sourcing" mode. For example, FIGS. 1 and 2 illustrate a touch screen substrate 2 in which respective X and Y excitations are produced on a touch region 4 by applying different corner voltages (in this case, 5 volts) to an electrode pattern 6 extending along the periphery 8 of the substrate 2. The arrows represent the direction of current flow across the touch region 4, and the dotted lines represent equipotential lines, i.e., lines along which the voltage is constant. For ideal linear touchscreen performance, the equipotential lines are perfectly straight lines, as suggested in FIGS. 1 and 2. Current flows perpendicular to these equipotential lines, so lines of current flow are straight when the equipotential lines are straight.

As shown in FIG. 1, an X excitation is generated by passing current through the touch region 4 injected at the right side of the border electrode pattern 6 and collected at the left side. That is, the left and right sides are in "sourcing" (or sinking) mode for the X excitation. Ideally, for X excitation, no current enters or exits the touch region 4 from the top and bottom sides. That is the top and bottom sides are "non-sourcing" for the X excitation.

As shown in FIG. 2, a Y excitation is generated by passing current through the touch region 4 injected at the top side of the border electrode pattern 6 and collected at the bottom side. That is, the top and bottom sides are in "sourcing" (or sinking) mode for the Y excitation. Ideally, for Y excitation, no current enters or exits the touch region 4 from the left and right sides. That is, the left and right sides are "non-sourcing" for the Y excitation. Electronics can obtain touch information from a 5-wire resistive touchscreen via the voltage excitation described above, as well as current injection and capacitive architectures. A 9-wire connection scheme, which provides drive and a sense line connections between the electronics and each of the four corner connection points, is also available. These and other technologies are described in U.S. patent application Ser. No. 09/705,383, which is expressly incorporated herein by reference.

One 5-wire connection touch sensor utilizes peripheral electrode patterns with discrete overlap resistors, such as those found in Elo TouchSystems' AccuTouch™ products and disclosed in U.S. Pat. No. 5,045,644, which is expressly incorporated herein by reference. In this case, parallel resistive current paths are provided through gaps within isolation lines between peripheral electrode patterns on opposite sides of the touch region. The current paths produce an undesirable ripple non-linearity in the touch region near the peripheral electrode pattern. As a result, a finger moving across a straight line in this region will experience variations in the excitation voltage and hence variations in the measured coordinate (unless otherwise corrected for). The considerable ripple adjacent to the top and bottom resistor chains limits the accuracy of measurements in this area, and thus, the size of the effective touch region is therefore reduced.

As a result, resistor chains have been designed to reduce the ripple often found at the periphery of the touch region. U.S. patent application Ser. No. 09/705,383 discloses an approach that reduces the ripple non-linearity on the sourcing sides of the touchscreen substrate by increasing the density of discrete electrical connections between the electrode border and the touch region, i.e., the number of gaps within the isolation lines are increased.

A problem arises in that while increasing the density of discrete electrical connections between the electrode border and the touch region improves linearity on the source sides, it provides more opportunities for parasitic sourcing and sinking of current on the non-sourcing sides. A higher density of electrical connections on the non-sourcing side tends to make matters worse. In particular, if there are more connections for the touch region than there are electrode voltages, then it is hard to avoid pairs of connections to the same electrode voltage and the consequent distortion of the desired linear voltage gradient. In practice, great linearity improvement on the sourcing sides is provided with a modest decrease in linearity on the non-sourcing sides. While this may appear to be quite a reasonable engineering trade-off, the marketplace is wary of anything that degrades any aspect of touchscreen performance.

This problem was conceptually addressed in U.S. patent application Ser. No. 09/705,383 by locating some of these gaps over the junctions between the electrodes, so that the effective voltage within these gaps is halfway between the voltages of adjacent electrodes. For example, FIG. 3 shows a resistor chain 48 having Z-electrodes 50 with overlapping outer and inner portions 51, 52, the inner portions 52 of adjacent electrodes being closest at junctions 54. An array of insulating regions 55 having two gaps 56 for each overlap resistor electrode 50 runs parallel to the inner portions 52. Some of the gaps 56 are over the junctions 54. As shown in the equivalent circuit of FIG. 4, this conceptually results in alternating connections being split between two adjacent electrodes 50, so that the effective voltage is halfway between the voltages of the adjacent electrodes 50, thereby decreasing the ripple on the non-sourcing sides of the touchscreen. The main current through the series resistor chain in non-sourcing mode is notated by the "I", while a secondary current "i" flows through the junction gap region, which is conceptually equivalent to a simple resistive voltage divider circuit composed of two equal resistances. Thus, as can be seen, the gap voltage sequence is $V_{N-1}$, $(V_{N-1}+V_N)/2$, $V_N$, $(V_N+V_{N+1})/2$, $V_{N+1}$ . . . .

It has been determined, however, that the effective voltage between adjacent electrodes 50 does not divide in practice. The insulating regions 55 are typically placed very close to the series resistor chain electrodes 50 in response to marketplace demand for minimal border width. The result is a gap width that is typically much bigger than the separation from the series resistor chain electrodes 50. With such an aspect ratio, there is insufficient room for the electrode voltages $V_N$ and $V_{N+1}$ to mix together and present an averaged voltage $(V_N+V_{N+1})/2$ to the touchscreen. Effectively, the equipotential lines of the touch region "see" both electrode voltages. Hence, the $V_N$ and $V_{N+1}$ equipotential lines tend to terminate on the electrodes 50, and all the equipotential lines in between $V_N$ and $V_{N+1}$ bunch up at the junction 54, as illustrated in FIG. 5. As such, the resistor chain 48 of FIG. 3 will, in practice, have the equivalent circuit illustrated in FIG. 6.

There thus remains a need to improve the non-sourcing side linearity of touchscreens with discrete resistor structures.

SUMMARY OF THE INVENTION

The present inventions are directed to a touch sensor that utilizes electrically conductive islands in junction gaps in order to provide a true voltage divider within the gaps, thereby providing a linearly varying voltage sequence along the resistor chain. The touch sensor can be operated as a resistive touch sensor, e.g., 5- or 9-wire, a capacitive touch sensor, or any touch sensor that requires series resistive chains.

The touch sensor comprises a substrate having a resistive surface bounded by a plurality of peripheral edges. The substrate may be transparent in the case of a touchscreen, or otherwise may be opaque. The resistive surface has a touch region that is interior to the peripheral edges. The touch sensor further comprises a series resistor chain proximate a peripheral edge for creating electric fields across the touch region. The resistor chain comprises a plurality of conductive electrodes (e.g., Z-electrodes) arranged in series with resistive regions of the surface forming overlap resistors therebetween. Each electrode has an inner portion facing the touch region, with the inner portions of adjacent electrodes being separated by junctions.

The touch sensor further comprises a linear array of insulating regions in the resistive surface (areas where the resistive layer is not present) between the touch region and the resistor chain. The insulating regions are separated by gaps, e.g., areas where the resistive surface is fully left intact. At least two of the gaps are formed between the touch region and an inner portion, and one of the gaps forms a junction gap between the touch region and a junction. In the preferred embodiment, junction gaps are formed between the touch region and junctions between at least one of the inner portions.

The touch sensor further comprises a conductive island located within the junction gap. In this manner, a voltage divider is formed within the junction gap, thereby minimizing bunching of equipotential lines on the electrodes during the non-sourcing mode. In the preferred embodiment, a conductive island is located within a plurality of the junction gaps to provide maximum benefit. To provide varying resistance between different gaps, e.g., a parabolic varying resistance along the length of the resistor chain, the non-junction gaps can be variously designed. For example, to provide maximum resistance, a non-junction gap may be empty, i.e., it contains no electrically conductive material. To provide minimum resistance, the non-junction gap may contain an extension from the inner portion of the electrode. To provide a resistance somewhere in between, the non-junction gap may contain a conductive island.

The present inventions are also directed to a touch sensor that utilizes various types of gaps to control the resistance values of the gaps. The touch sensor may be similarly constructed as described above. At least two of the gaps (which can be junction and/or non-junction gaps), however, are selected from different ones of an empty gap, an island gap having an electrically conductive island, and an electrode gap having an electrically conductive extension from one of the inner portions. For example, two of the gaps can be an empty gap and an island gap, an empty gap and an electrode gap, or an island gap and an electrode gap. In the case of three gaps, a first one can be an empty gap, a second one can be an island gap, and a third one can be an electrode gap.

In this manner, the gaps can be substantially the same width, yet have substantially different resistances. For example, the gaps along one peripheral electrode can have parabolic varying resistances. Or the gaps can have substantially different widths, yet have substantially the same resistances.

BRIEF DESCRIPTION OF THE DRAWINGS

The drawings illustrate the design and utility of a preferred embodiment of the present invention, in which similar elements are referred to by common reference numerals. In order to better appreciate the advantages and objects of the present invention, reference should be made to the accompanying drawings that illustrate this preferred embodiment. However, the drawings depict only one embodiment of the invention, and should not be taken as limiting its scope. With this caveat, the invention will be described and explained with additional specificity and detail through the use of the accompanying drawings in which:

FIG. 12 is a plan view of the top right corner of a gradient sheet used in the touchscreen of FIG. 7; and FIG. 13 is a plan view of a display, particularly showing software touch buttons that require having asymmetric positional accuracy requirements in the X- and Y-directions.

DETAILED DESCRIPTION OF THE PREFERRED EMBODIMENTS

Figure 1:
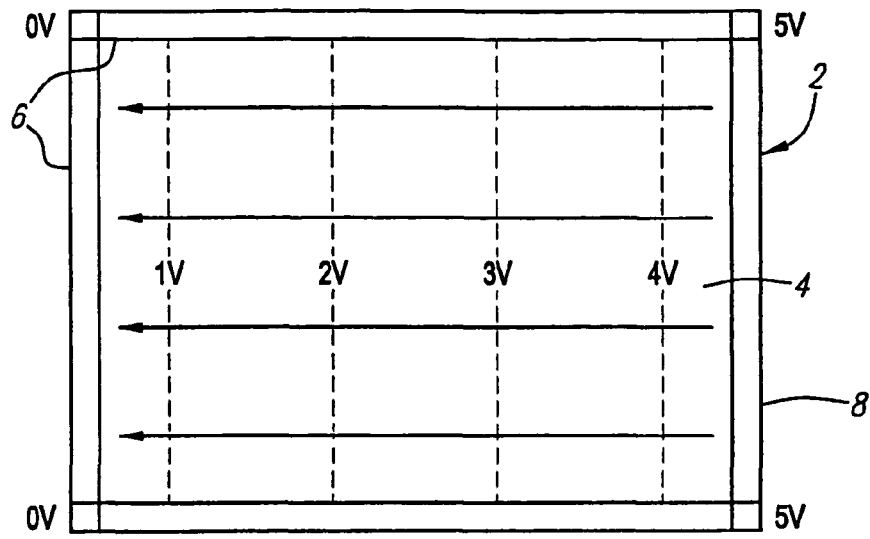
FIG. 1 is a plan view of a prior art touchscreen being operated to provide X-excitation signals, so that the left and right sides are in the sourcing mode, and the top and bottom sides are in the non-sourcing mode.
Figure 2:
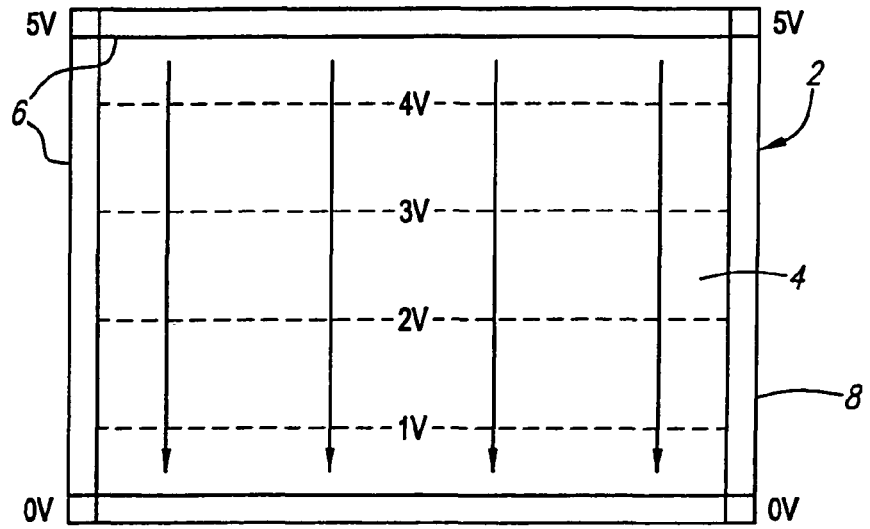
FIG. 2 is a plan view of a prior art touchscreen being operated to provide Y-excitation signals, so that the left and right sides are in the non-sourcing mode, and the top and bottom sides are in the sourcing mode.
Figure 3:
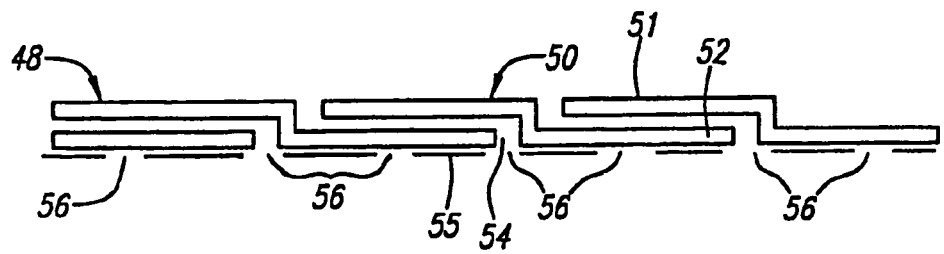
FIG. 3 is a schematic of a series resistor chain having two gaps (one junction and one non-junction) per overlap resistor electrode.
Figure 4:
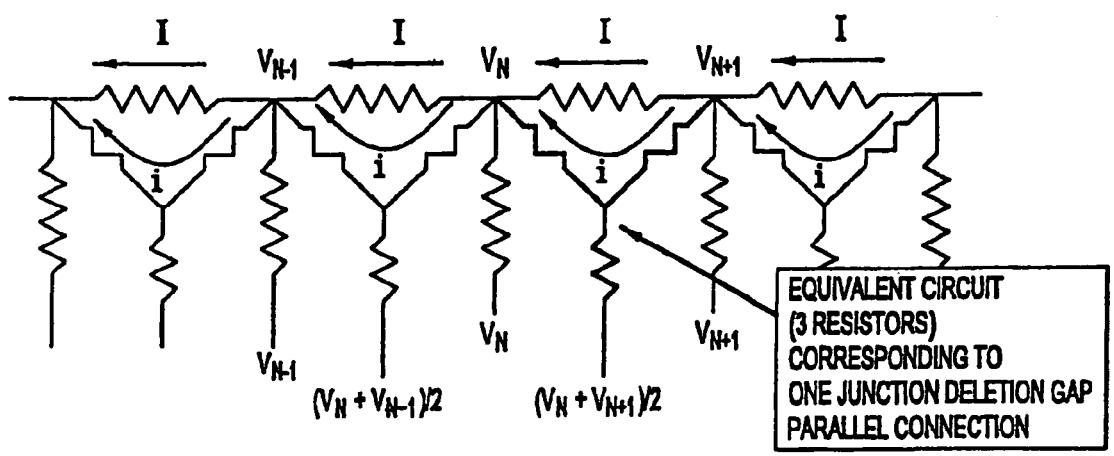
FIG. 4 is an equivalent circuit for the resistor chain of FIG. 3.
Figure 5:
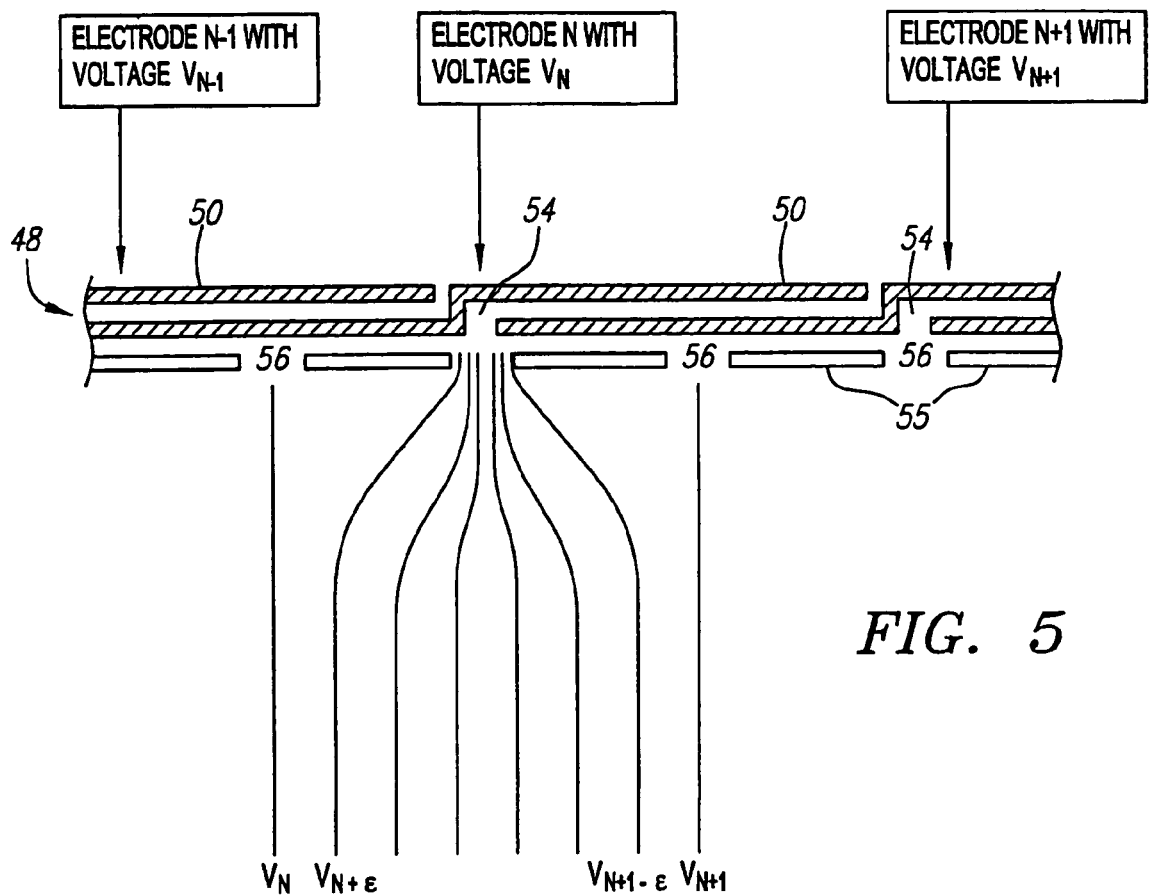
FIG. 5 is a schematic of a portion of the series resistor chain of FIG. 3, particularly showing equipotential lines non-linearly terminating on the resistor chain when operated in the non-sourcing mode.
Figure 6:
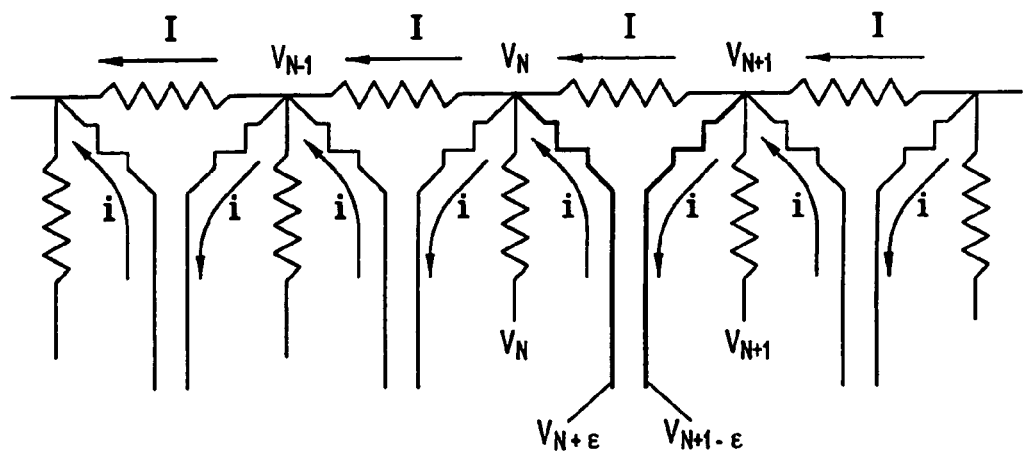
FIG. 6 is a practical equivalent circuit for the resistor chain of FIG. 3, particularly showing current flow and voltage potential.
Figure 7:
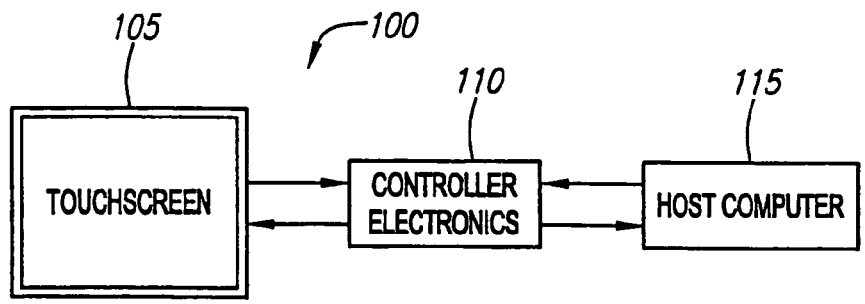
FIG. 7 is a functional diagram of a touch system constructed in accordance with a preferred embodiment of the present inventions.

Referring to FIG. 7, a resistive touchscreen system 100 constructed in accordance with a preferred embodiment of the present invention is described. The touchscreen system 100 generally comprises a touchscreen 105 (i.e., a touch sensor having a transparent substrate), controller electronics 110, and a display 120. The touchscreen system 100 is typically coupled to a host computer 115. Generally, the controller electronics 110 receives from the touchscreen 105 analog signals carrying touch information. The controller electronics 110 also sends to the touchscreen 105 excitation signals. Specifically, the controller electronics 110 establishes a voltage gradient across the touchscreen 105. The voltages at the point of contact are representative of the position touched. The controller electronics 110 digitizes these voltages and transmits these digitized signals, or touch information in digital form based on these digitized signals, to the host computer 115 for processing.

Figure 8:
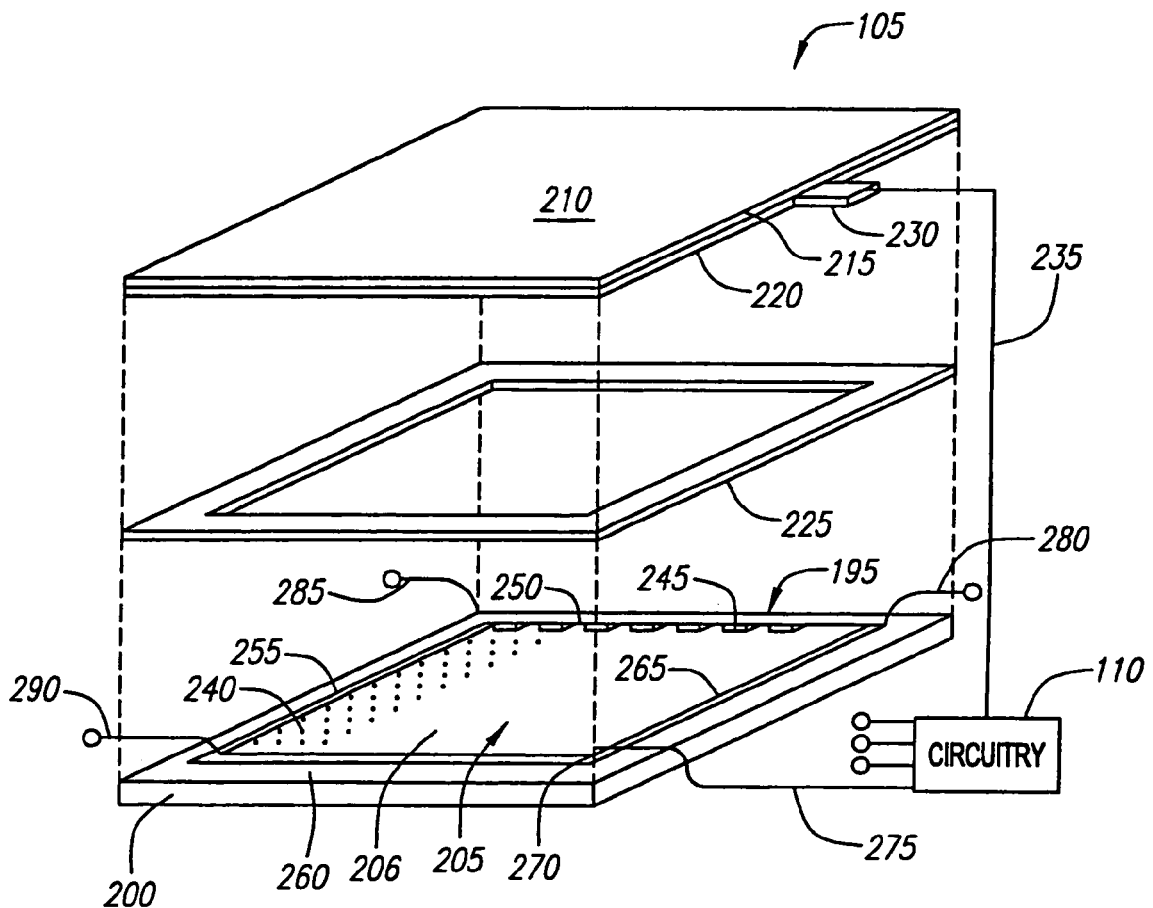
FIG. 8 is an exploded view of a touchscreen used in the touch system of FIG. 7.

Referring to FIG. 8, the touchscreen 105 will now be described in further detail. It will be recognized that the thickness, height, or other dimensions of some of the components in some of the drawings has been exaggerated for purposes of illustration. The touchscreen 105 comprises a gradient sheet 195 including a substrate 200 having a uniform resistive layer 205 permanently applied to one surface thereof. The resistive layer 205 further includes a touch region 206.

The geometry of the substrate 200 may be, for example, planar (as shown in FIG. 8), or may be contoured to match the face of a curved object, such as a Cathode Ray Tube (CRT) face or other conventional video display screens. The substrate 200 can also have any perimeter configuration, e.g., rectangular (as shown), substantially rectangular, or circular.

To provide the necessary transparency, the substrate 200 and resistive layer 205 are preferably made of a substantially transparent material. Alternatively, if the resultant product is to be an opaque sensor, then the substrate 200 may be composed of an opaque material. Spaced a small distance above the resistive layer 205 is a cover sheet 210, which is typically a flexible film 215 having a conductive coating 220 on the underside of the flexible film 215. The cover sheet 210 is joined to the remainder of the touchscreen 105 with an adhesive along its associated edges, or optionally, with an insulative adhesive frame 225 or the like. Additionally, an electrode 230 connects the conductive coating 220 of the cover sheet 210 via lead 235 to appropriate external circuitry, such as the controller circuit 110. The conductive coating 220 attached to the cover sheet 210 is separated from the resistive layer 205 by a plurality of small transparent insulator islands or dots 240, which prevent accidental contact between the conductive coating 220 and the resistive layer 205.

While the embodiment depicted in FIG. 8 utilizes the cover sheet 210, any conducting element, such as a conducting stylus (not shown), can be used as an alternative. This conducting stylus may be used when the resistive layer 205 is sufficiently durable as to withstand damage from such contact. As another alternative, a capacitive or resistive pickup system can be used along with a user's finger or with an appropriate probe.

With continuing reference to FIG. 8, a resistor chain 245 is spaced along each edge of the resistive layer 205 and is used for applying potentials to the resistive layer 205, so as to create orthogonal voltage gradients therein. As to be shown in subsequent figures, the resistor chain 245 (composed of conductive regions, insulating regions, and resistive regions) includes discrete resistance units connected in series. The resistance values of the resistor chain 245 depend partly upon the resistive value of the resistive layer 205 that forms part of the resistor chain 245. However, the resistance values of the resistor chain 245 may vary in accordance with design requirements. There are four resistor chains 245 in the embodiment of FIG. 8, which are more specifically labeled 250, 255, 260, and 265. The ends of each resistor chain 250, 255, 260 or 265 are joined at or near the corners 270 of the resistive layer 205. Each of the corners 270 is provided with a respective one of the electrical leads 275, 280, 285, 290. In this manner, the touchscreen 105 is connected to the controller electronics 110, which provides the voltage to the resistor chain 245 and processes information from the touchscreen 105.

When the touchscreen 105 is pressed, the conductive coating 220 of the cover sheet 210 makes direct electrical contact with the resistive layer 205 on the substrate 200. For a quasi-DC resistive touchscreen, commonly referred to as a "resistive touchscreen," the cover sheet 210 can function as either a voltage sensing probe for sensing the voltage at the contacted area, or as a current injection source. As another option, the coversheet 210 may be replaced with a thin dielectric coating applied directly to resistive layer 205, in which case, the controller electronics 110 may support AC operation.

Further details on the general construction of touch screen system 100 is disclosed in U.S. Pat. No. 6,163,313, which is expressly incorporated herein by reference.

Figure 9:
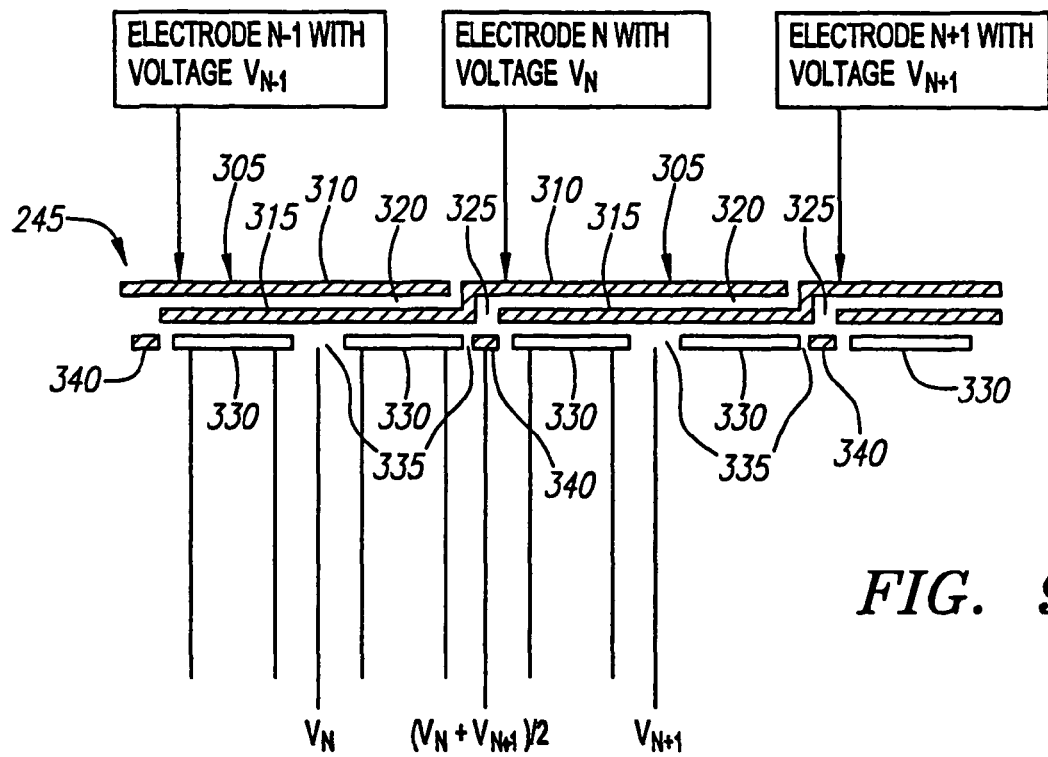
FIG. 9 is a schematic of a series resistor chain used in the touchscreen of FIG. 7.

Referring now to FIG. 9, a portion of the resistor chain 245 will now be described in further detail. The resistor chain 245 has Z-shaped electrodes 305, each having an outer portion 310 and an inner portion 315. The inner portion 315 of a first electrode 305 overlaps the outer portion 310 of a second, adjacent electrode 305. As a result, the resistive layer 205 (shown in FIG. 8) between these inner and outer portions forms a resistive connection 320. The inner portions 315 of adjacent electrodes 305 are separated from each other by junctions 325. A plurality of insulating regions 330 are formed in the gradient sheet 195 (shown in FIG. 8), for example, by removing the resistive layer 205 at selected places. Thereafter, areas of resistive coating 205 remain between adjacent insulating regions 330, referred to herein as "gaps" 335. Some of the gaps 335 are positioned between the inner portions 315 of the electrodes 305 and the touch region 206 (referred to as "non-junction gaps") and some of the gaps 335 are positioned between the junctions 325 and the touch region 206 (referred to as "junction gaps").

The insulating regions 330 and gaps 335 may also be formed by removing a line of the resistive layer 205 (an insulation line) and thereafter placing resistive material, such as ITO, on the sheet at selected places along the insulation line. In the illustrated embodiment, the insulating regions 330 and gaps 335 are formed in a line parallel to the inner portions 315 of the electrodes 305. As a result, a plurality of parallel current paths across the touch region 206 are established. The insulating regions 330 may be readily formed by laser ablation of the resistive layer 205. Insulating subsections extending between the electrodes 305 may also be formed. Laser adjustment of these subsections effectively trims the resistors between the electrodes 305.

Figure 10:
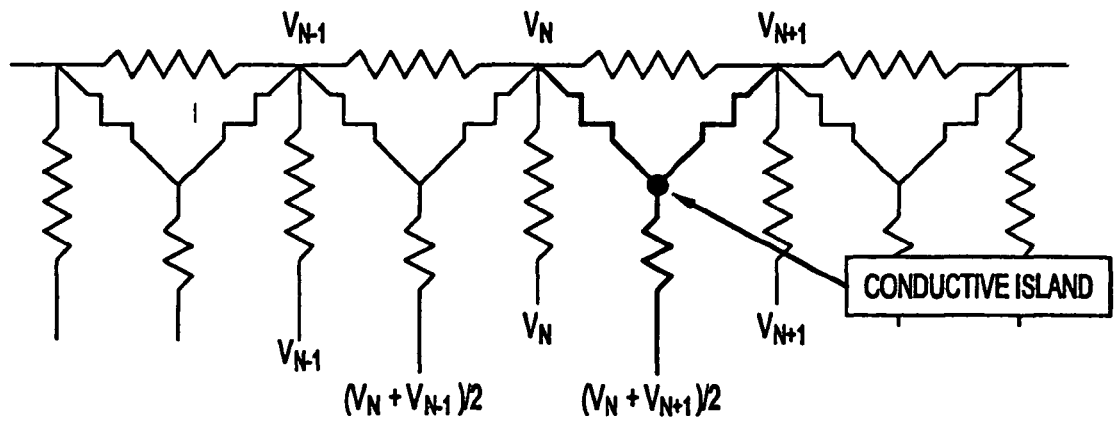
FIG. 10 is an equivalent circuit for resistor chain of FIG. 9.

In order to achieve the object of a true voltage divider at the junction 325 between adjacent electrodes 305, a conductive region or "island" 340 is positioned within the junction gaps 335. The conductive material may be, e.g., a conductive frit. As a result, the $V_N$ equipotential line in the touch region 206 no longer "sees" the electrode with voltage $V_N$ through the junction gap 335, because the conductive island 340 cleanly provides the electronic node for the desired equivalent circuit, as illustrated in FIG. 10.

Simulations and prototype touchscreens have shown that the use of conductive islands 340 within the junction gaps 335 not only avoids increased ripple non-linearity on the non-sourcing side, but in fact, compared to existing commercial products with one electrical connection per overlap-resistor electrode, linearity on the non-sourcing side is improved. The reason for this improvement can be appreciated in FIG. 9, which illustrates equipotential lines of the touch region 206 as they approach the electrode border. Because a conducting region is at a constant voltage, at most one equipotential line can terminate on a conductive electrode 305 or conducting island 340. In contrast, many equipotential lines may terminate on a insulating region 330. Loosely speaking, conducting regions connected to the touch region through the gaps 335 "repel" equipotential lines. The wider the gap is, the larger the distortion of the equipotential lines, and hence the greater is the ripple non-linearity. Replacing a large gap with a conductive island surrounded by two smaller gaps can provide a significant net gain in non-sourcing ripple non-linearity.

Thus, minimizing gap widths minimizes the amount of non-sourcing ripple non-linearity. It should be noted, however, that wider gaps are preferred for minimizing sourcing ripple non-linearity. As a result, it is best to avoid too much variation in gap widths. This desire to avoid unnecessary variation in gap widths, however, competes with another design requirement. As is well known in the prior art, a linear touchscreen design requires a parabolic variation in resistance of the connections between the touch region and the resistor chain series. As such, it is preferred that the gap widths, at least in the prior art, vary.

Figure 11A:
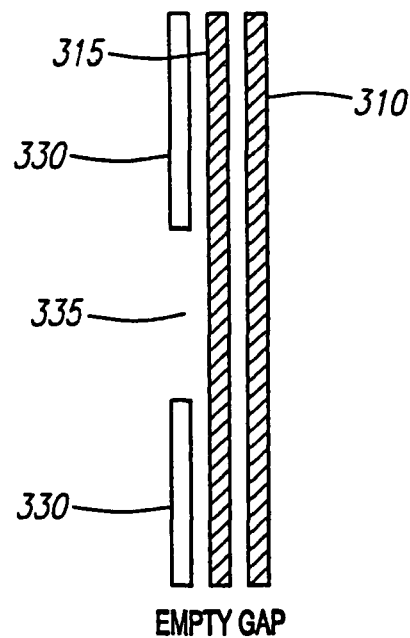
FIGS. 11a-c are schematics of different types of gap arrangements that can be used in the series resistor chain of FIG. 9.
Figure 11B:
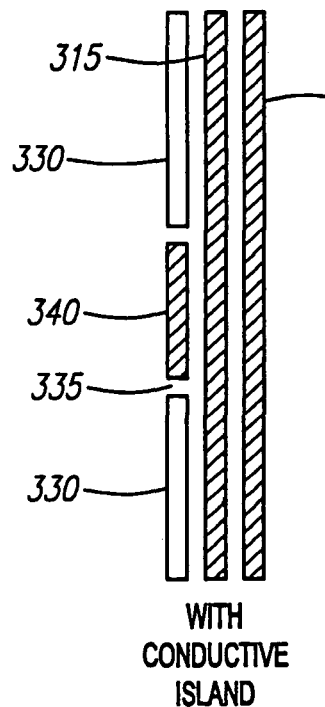
Figure 11C:
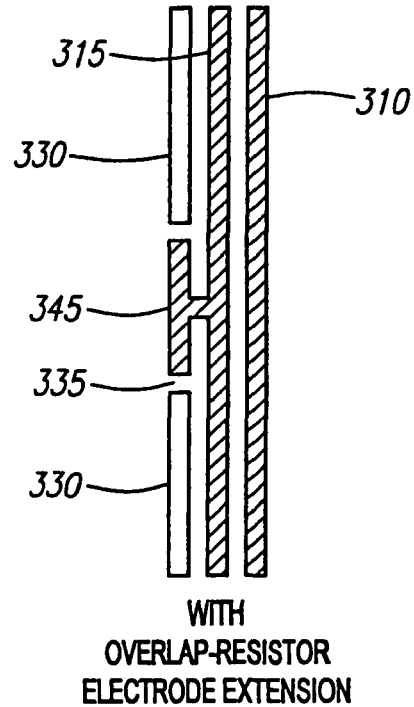

Given this, the resistor chain 245 preferably employs a variety of gap designs. Specifically, the resistor chain 245 comprises three different types of gap designs: an empty gap; a gap with a conductive island 340; and a gap with an electrode extension of an overlap-resistor electrode 305 (e.g., a "T"). These three types are illustrated in FIGS. 11a-c. Even if the gaps are all the same width, as illustrated in FIGS. 11a-c, the three different gap designs provide different resistances between the resistor chain 245 and the touch region 206. The empty gap illustrated in FIG. 11a has the higher resistance, and a "T" shaped electrode extension 345 illustrated in FIG. 11c provides the lowest resistance. Alternatively, for the same resistance to the touch region 206, the empty gap will be wider and the "T" shaped electrode extension 345 will be narrower. Using this design degree of freedom to provide, in part, the desired parabolic resistance variations, has the beneficial result of reducing the needed variation in gap widths to some extent, thereby improving linearity. This flexibility also helps avoid tolerance issues involving the screen-printing of extremely small conductive islands 340 and gaps 335.

As illustrated in FIG. 12, the resistor chain 245, in addition to using conductive islands 340 within the junction gaps 335, also uses the different types of gap designs illustrated in FIGS. 11a-c within the non-junction gaps 335 to provide the necessary parabolic resistance variation. Although it is generally desirable to use conductive islands 340 within the junction gaps 335 in order to improve ripple linearity along the non-sourcing side as previously discussed, it is sometimes desirable to use empty gap designs (FIG. 11a) for the junction gaps 335. For example, in cases where a high resistance is desired, such as at the gaps 335 adjacent the corners, it may be advantageous to use the empty gap design in combination with a relatively narrow gap through which there is less of a problem of the touch region 206 "seeing" the unmixed voltages of the pair of electrodes 305 through the junction gap 335.

It should be noted that in some applications, it may be desirable to fully optimize the linearity of one coordinate at the expense of increased border ripple non-linearity in the other coordinate, e.g., when there exists an application that has unequal demands for X and Y linearity. For example, consider FIG. 13, which illustrates an exemplary display of software touch buttons 355 that one may see when viewing the display of the touchscreen system 100. As can be seen, the touch buttons 355 are much wider than they are tall. Thus, for the user to correctly activate the intended touch button 355, the touchscreen system 100 must correctly determine the Y-coordinate with small errors, but only roughly determine the X-coordinate.

As previously discussed, for Y-coordinate measurement, the left and right sides of the electrode border are non-sourcing and the top and bottom sides are sourcing. For such an application, it may be advantageous to use gaps 335 with conductive islands 340 on the left and right sides of the electrode border, and then to use more than two gaps per electrode on the top and bottom sides of the electrode border. Such a design leads to increased ripple non-linearity along the top and bottom for the X-coordinate measurement, but this is of secondary importance for applications, such as that illustrated in FIG. 13.

Although the above discussion has been set forth in the context of a resistive touchscreen system 100, it applies to the more general setting of a touch-sensitive system. This includes other types of touch sensors (e.g., opaque touch pads or touch sensitive robot shells). A variety of sensors with sensitive surfaces can be imagined. Indeed, the resistive touchscreen system 100 is really just a specific type of a touch sensitive system, where the gradient sheet 195 and cover sheet 210 are specifically designed to operate in the touchscreen 105. Thus, the present discussion, in its broadest aspects, should be thought of as applying in that more general setting.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A touch sensor, comprising:
 a substrate having a resistive surface bounded by four peripheral edges that terminate at four corners, said resistive surface having a touch region interior to said edges;
 a single series resistor chain proximate each peripheral edge for creating electric fields across said touch region, said resistor chain comprising a plurality of conductive electrodes arranged in series with resistive regions of said resistive surface to form overlap resistors therebetween, each electrode including an outer portion in step connection with an inner portion such that said inner portion is closer to said touch region than said outer portion and wherein inner portions of electrodes are parallel to, and separated by said resistive regions from, outer portions of adjacent electrodes, said inner portions of adjacent electrodes being separated by junctions, the series resistor chain electrically connected at a corner of the resistive surface;
 a linear array of insulating regions in said resistive surface between said touch region and parallel to said single series resistor chain, said insulating regions being separated by gaps, at least one of said gaps formed between said touch region and at least one junction forming a junction gap; and
 an electrically conductive island located within said at least one junction gap.

2. The touch sensor of claim 1, wherein two gaps are formed between said touch region and two adjacent inner portions, and said at least one junction gap is between said two gaps.

3. The touch sensor of claim 1, wherein said substrate is substantially transparent.

4. The touch sensor of claim 1, wherein non-junction gaps are formed between said touch region and at least a majority of said inner portions.

5. The touch sensor of claim 1, wherein junction gaps are formed between said touch region and at least a majority of said junctions.

6. The touch sensor of claim 1, further comprising an electrically conductive island located within at least a plurality of said junction gaps.

7. The touch sensor of claim 1, wherein said resistive surface is fully intact within said gaps.

8. The touch sensor of claim 1, wherein said array of insulating regions is a line where said resistive surface has been removed, said line being parallel to said resistor chain.

9. The touch sensor of claim 1, wherein the electric fields are non-linear.

10. A touch sensor, comprising:
 a substrate having a resistive surface bounded by a plurality of peripheral edges, said resistive surface having a touch region interior to said edges;
 a single series resistor chain proximate a peripheral edge for creating electric fields across said touch region, said resistor chain comprising a plurality of conductive electrodes arranged in series with resistive regions of said surface to form overlap resistors therebetween, each electrode having an outer portion in step connection with an inner portion such that said inner portion is closer to said touch region than said outer portion and wherein said inner portions of electrodes are parallel to, and separated by resistive regions from, outer portions of adjacent electrodes, and wherein said inner portions of adjacent electrodes being separated by junctions, the series resistor chain electrically connected at a corner of the resistive surface;
 a linear array of insulating regions in said resistive surface between said touch region and said resistor chain, said insulating regions being separated by gaps, wherein at least two of said gaps are selected from different ones of: an empty gap, an island gap having an electrically conductive island, and an electrode gap having an electrically conductive extension from one of said inner portions.

11. The touch sensor of claim 10, wherein said at least two of said gaps are respectively said empty gap and said island gap.

12. The touch sensor of claim 10, wherein said at least two of said gaps are respectively said empty gap and said electrode gap.

13. The touch sensor of claim 10, wherein said at least two of said gaps are respectively said island gap and said electrode gap.

14. The touch sensor of claim 10, wherein said at least two of said gaps comprises three gaps, a first of which is said empty gap, a second of which is said island gap, and a third of which is said electrode gap.

15. The touch sensor of claim 10, wherein said at least two gaps are adjacent to each other.

16. The touch sensor of claim 10, wherein said at least two gaps form junction gaps between said touch region and respective junctions.

17. The touch sensor of claim 10, wherein said at least two gaps form non-junction gaps between said touch region and respective inner portions.

18. The touch sensor of claim 10, wherein said at least two gaps have substantially the same width and substantially different resistances.

19. The touch sensor of claim 10, wherein said at least two gaps have substantially different widths and substantially the same resistances.

20. The touch sensor of claim 10, wherein said gaps have parabolic varying resistances.

21. The touch sensor of claim 10, wherein said resistive surface is fully intact within said gaps.

22. The touch sensor of claim 10, wherein said insulating regions run parallel to said resistor chain.

23. The touch sensor of claim 10, wherein said array of insulating regions is a line where said resistive surface has been removed, said line being parallel to said resistor chain.

24. The touch sensor of claim 10, wherein the electric fields are non-linear.

25. A touch sensor, comprising:
- a substrate having a resistive surface at least partially bounded peripherally by edges, said resistive surface having a touch region interior to said edges;
- a series resistor chain proximate said edges for creating electric fields across said touch region, said series resistor chain comprising a plurality of conductive electrodes arranged in series with resistive regions of said resistive surface to form overlap resistors therebetween, each electrode including an outer portion in step connection with an inner portion such that said inner portion is closer to said touch region than said outer portion and wherein inner portions of electrodes are parallel to, and separated by said resistive regions from, outer portions of adjacent electrodes, wherein said inner portions of adjacent electrodes are separated by junctions of said resistive surface;
- a linear array of insulating regions in said resistive surface, said linear array disposed along said series resistor chain and formed between said touch region and said series resistor chain, said insulating regions being separated from each other by gaps, wherein junction gaps are those of said gaps formed between said touch region and said junctions; and
- an electrically conductive island within at least one of said junction gaps.

26. The touch sensor of claim 25, wherein at least two of said gaps formed between said inner portions and said touch region are non-junction gaps, wherein said non-junction gaps are those of said gaps that are not said junction gaps.

27. The touch sensor of claim 26, wherein said non-junction gaps are formed between junction gaps.

28. The touch sensor of claim 26, wherein a majority of said junction gaps have electrically conductive islands therein.

29. The touch sensor of claim 26, wherein at least one non-junction gap has an electrically conductive element therein, and at least one non-junction gap has a conductive element extending from an inner portion of an adjacent electrode.

30. The touch sensor of claim 25, wherein said substrate is substantially transparent.

31. The touch sensor of claim 25, further comprising a dielectric coating disposed over said touch region.

32. The touch sensor of claim 25, wherein said resistive surface is at least partially bounded peripherally by a pair of opposing edges.

33. The touch sensor of claim 25, wherein said resistive surface is bounded peripherally by four edges terminating to form four corners.

34. The touch sensor of claim 25, wherein said resistive surface is fully intact within said gaps.

35. The touch sensor of claim 25, wherein said insulating regions are lines where said resistive surface has been removed, said lines being parallel to said series resistor chain.

36. The touch sensor of claim 25, wherein a plurality of conductive paths per overlap resistor is formed between said touch region and said respective resistor chain.

37. The touch sensor of claim 25, wherein the electric fields are non-linear.

* * * * *